United States Patent
Wala et al.

(10) Patent No.: US 9,240,814 B2
(45) Date of Patent: Jan. 19, 2016

(54) ULTRASONIC RECEIVER FRONT-END

(75) Inventors: Shabbir Amjhera Wala, Bangalore (IN); Shagun Dusad, Bangalore (IN); Sandeep Oswal, Bangalore (IN); Vajeed Nimran, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 968 days.

(21) Appl. No.: 13/430,933

(22) Filed: Mar. 27, 2012

(65) Prior Publication Data

US 2013/0258812 A1    Oct. 3, 2013

(51) Int. Cl.
*H04B 1/06* (2006.01)
*G01S 7/52* (2006.01)

(52) U.S. Cl.
CPC .............. *H04B 1/06* (2013.01); *G01S 7/52025* (2013.01)

(58) Field of Classification Search
CPC . G01S 15/00; G01S 7/52033; G01S 7/52025; H04B 1/06
USPC ................................. 333/81 R; 330/254, 144
See application file for complete search history.

(56) References Cited

U.S. PATENT DOCUMENTS

| | | | | |
|---|---|---|---|---|
| 4,228,402 A * | 10/1980 | Plummer | | 381/102 |
| 5,267,071 A * | 11/1993 | Little et al. | | 398/162 |
| 6,359,724 B1 | 3/2002 | Katagiri et al. | | |
| 6,836,184 B1 * | 12/2004 | Daughtry et al. | | 330/144 |
| 2001/0020868 A1 * | 9/2001 | Kim | | 330/151 |
| 2004/0197105 A1 * | 10/2004 | Khatana et al. | | 398/173 |
| 2005/0151215 A1 * | 7/2005 | Hauhe et al. | | 257/421 |
| 2006/0238246 A1 * | 10/2006 | Ishigami | | 330/151 |
| 2007/0133442 A1 * | 6/2007 | Masuda et al. | | 370/286 |
| 2007/0275686 A1 * | 11/2007 | Stevenson et al. | | 455/234.1 |
| 2008/0048751 A1 | 2/2008 | Koen | | |
| 2008/0272865 A1 * | 11/2008 | Chen et al. | | 333/81 R |
| 2009/0043526 A1 * | 2/2009 | Zhang | | 702/121 |
| 2009/0140810 A1 | 6/2009 | Kim et al. | | |
| 2010/0073080 A1 * | 3/2010 | Jung | | 327/551 |
| 2010/0080083 A1 * | 4/2010 | Oswal et al. | | 367/98 |
| 2010/0227574 A1 * | 9/2010 | Kuenen et al. | | 455/115.2 |
| 2013/0241656 A1 * | 9/2013 | Tajima et al. | | 330/295 |

FOREIGN PATENT DOCUMENTS

| KR | 1020050014051 | 2/2005 |
|---|---|---|
| WO | WO 2005117709 | 12/2005 |

* cited by examiner

*Primary Examiner* — Luke Ratcliffe
*Assistant Examiner* — Hovhannes Baghdasaryan
(74) *Attorney, Agent, or Firm* — Alan A. R. Cooper; Frank D. Cimino (57) ABSTRACT

In certain embodiments, systems for receiving one or more echoes are provided. The system comprises a first attenuator, a first amplifier, and a second attenuator. The first attenuator is configured to receive the one or more echo signals, and generate a corresponding set of first attenuated echo signals, respectively, based on a number of signal strengths of the one or more echo signals. The first amplifier is configured to receive and amplify the set of first attenuated echo signals to thereby generate a set of first amplified echo signals corresponding to the one or more first attenuated echo signals, respectively. The second attenuator is configured to receive the set of first amplified echo signals and generate a set of second attenuated echo signals corresponding to the set of first amplified echo signals, respectively, based on a number of signal strengths of the set of first amplified echo signals, respectively.

17 Claims, 2 Drawing Sheets

ULTRASONIC RECEIVER FRONT-END

TECHNICAL FIELD

The present disclosure generally relates to receiver front-end in ultrasonic systems.

BACKGROUND

In accordance with an exemplary scenario, various systems utilize echoes of previously transmitted signals for information generation. For example, an ultrasound system utilizes echoes of transmitted ultrasound signals to thereby generate information pertaining to visual and/or other information of an object. In accordance with one exemplary scenario, the ultrasound signals are transmitted to a subject, for example, a human body, from an ultrasound probe, and, in response, echoes of the acoustic energy are reflected from various acoustic impedance discontinuities within the body. The echoes are received by a transducer integrated within the ultrasound system. The echoes (or the reflected ultrasound signals) are amplified and digitized to generate an ultrasound image of the subject.

SUMMARY

Systems for receiving one or more echo signals are disclosed. In one embodiment, a system comprises a first attenuator, a first amplifier, and a second attenuator. The first attenuator is configured to receive one or more echo signals and generate a set of first attenuated echo signals corresponding to the one or more echo signals, respectively, based on a number of signal strengths of the one or more echo signals, respectively. The first amplifier is configured to receive and amplify the set of first attenuated echo signals to thereby generate a set of first amplified echo signals corresponding to the one or more first attenuated echo signals, respectively. The second attenuator configured to receive the set of first amplified echo signals and generate a set of second attenuated echo signals corresponding to the set of first amplified echo signals, respectively, based on a number of signal strengths of the set of first amplified echo signals, respectively.

In one embodiment, a receiver front-end for receiving one or more echoes is disclosed. The receiver front-end comprises a first attenuator, a first amplifier, a variable gain amplifier (VGA), a filter and a converter. The first attenuator is configured to receive one or more echo signals and generate a set of first attenuated echo signals corresponding to the one or more echo signals, respectively, based on a number of signal strengths of the one or more echo signals, respectively. The first amplifier is configured to receive and amplify the set of first attenuated echo signals to thereby generate a set of first amplified echo signals corresponding to the one or more first attenuated echo signals, respectively. The VGA comprises a second attenuator and a second amplifier. The second attenuator is configured to receive the set of first amplified echo signals and generate a set of second attenuated echo signals corresponding to the set of first amplified echo signals, respectively, based on a number of signal strengths of the set of first amplified echo signals, respectively. The second amplifier is coupled with the second attenuator. The second amplifier and the second attenuator are collectively configured to equalize a voltage level of the set of first amplified echo signals received form the output of the first amplifier based on time gain compensation. The filter is coupled with the second amplifier and configured to filter, from the set of second attenuated echo signals, a number of echo signals comprising a signal frequency within a predetermined frequency range to thereby generate one or more filtered echo signals. The converter is coupled with the filter and configured to convert the one or more filtered echo signals into a received signal.

In one embodiment, an ultrasound system is disclosed. The ultrasound system comprises a transmitter, at least one transducer and a receiver front-end. The transmitter is configured to generate and transmit one or more excitation signals. The at least one transducer is coupled with the transmitter and configured to generate a transmit signal based on the one or more excitation signals. The receiver front-end comprises a first attenuator, a first amplifier, a variable gain amplifier (VGA), a filter and a converter. The first attenuator is configured to receive one or more echo signals and generate a set of first attenuated echo signals corresponding to the one or more echo signals, respectively, based on a number of signal strengths of the one or more echo signals, respectively. The first amplifier is configured to receive and amplify the set of first attenuated echo signals to thereby generate a set of first amplified echo signals corresponding to the one or more first attenuated echo signals, respectively. The VGA comprises a second attenuator and a second amplifier. The second attenuator is configured to receive the set of first amplified echo signals and generate a set of second attenuated echo signals corresponding to the set of first amplified echo signals, respectively, based on a number of signal strengths of the set of first amplified echo signals, respectively. The second amplifier is coupled with the second attenuator. The second amplifier and the second attenuator are collectively configured to equalize a voltage level of the set of first amplified echo signals received from the output of the first amplifier based on time gain compensation. The filter is coupled with the second amplifier and configured to filter, from the set of second attenuated echo signals, a number of echo signals comprising a signal frequency within a predetermined frequency range to thereby generate one or more filtered echo signals. The converter is coupled with the filter and configured to convert the one or more filtered echo signals into a received signal.

DETAILED DESCRIPTION

Pursuant to an exemplary scenario, an ultrasound technique may be employed for quantitative measurements in various applications, such as for humans, animals, distance measurement, and the like. In one exemplary scenario, an ultrasound imaging system includes one or more transducer elements that emit ultrasound signals onto an object to be examined and receive back the echoes of these signals, which are processed to determine an image of the object. An example block diagram of an ultrasound system is described in FIG. 1.

Figure 1:
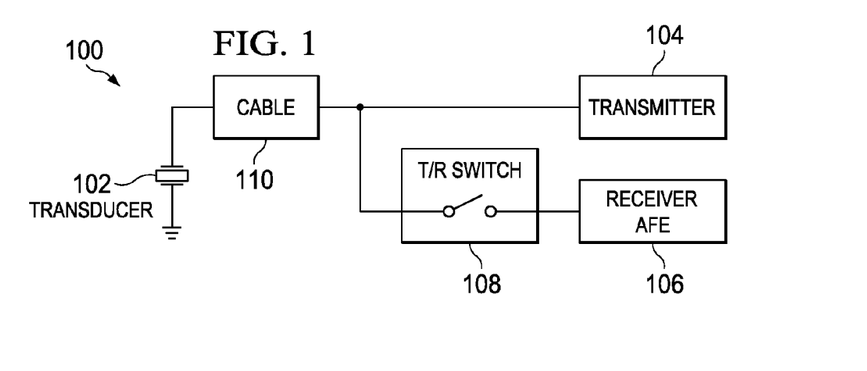
FIG. 1 illustrates a block diagram of an ultrasound system in accordance with an exemplary embodiment.

FIG. 1 illustrates a block diagram of an ultrasound system 100 according to an exemplary embodiment. The ultrasound system 100 includes a transducer 102, a transmitter 104, a receiver analog front-end (AFE) 106, a transmit-receive (T/R) switch 108 and a cable 110.

The transmitter 104 emits transmit excitation pulses sufficient to excite the transducer 102 to ultrasound oscillations. The transducer 102 includes or is composed of a piezoelectric material, such as piezoelectric ceramics. It is noted that the transducer 102 may include a single transducer or an array of transducers for performing the conversion. For example, the transducer 102 may include a transducer array having multiple transducers arranged spatially in a preselected pattern, for example, in a linear fashion, with transducers arranged side-by-side in a line. In an embodiment, each of the transducer of the transducer array may be excited by a separate transmit signal generated from a distinct transmitter. By controlling the characteristics of the transmit signals provided as input to each of the transducers, the transducer array may be caused to transmit a pulse (e.g., a transmit signal) in a preselected direction or at a preselected angle.

In an embodiment, the transducer 102 is configured to operate in a transmitting mode as well as in a receiving mode. In the transmitting mode, the transducer 102 convert electrical signals into mechanical vibrations and produce transmit ultrasonic signals. When the transmit ultrasonic signals travel in a medium, for example, a body of a subject or a tissue, they experience attenuation due to scattering, absorption and other propagation effects. The transmit ultrasonic signals are then reflected from the medium in the form of receive ultrasonic signals, and are received by the transducer 102. In the receiving mode, the receive ultrasonic signals make the piezoelectric element of the transducer 102 vibrate, and the transducer 102 converts the mechanical signals into electrical signals.

The receive ultrasonic signals from the deeper tissues are attenuated more than the received signals from the near field tissues. Additionally, the reflected signals from the deeper tissues may take longer to reach to the transducer than those reflected from the near field tissues. The reflected or the received ultrasonic signals may herein after be referred to as echoes or echo signals.

In an embodiment, during the transmission of the transmit ultrasonic signals by the transmitter 104, an output of the transmitter 104 toggles at about +/−100V, between rail to rail, to thereby excite the transducer 102. In an embodiment, the T/R switch 108 is configured to protect the receiver AFE from the high voltage ultrasonic signals transmitted from the transmitter 104. In one embodiment, the T/R switch 108 may be implemented as a diode bridge. In an embodiment, the T/R switch 108 is implemented like a voltage damper for clamping the +/−100V output of the transmitter 104 to +/−1V, and replicate the signal if it is lower than +/−1V. The receiver AFE 106 therefore sees the +/−1V square wave while in transmission, followed by a small signal coming from the transmitter 104.

The T/R switch 108 is followed by the receiver AFE 106 that includes various components for receiving and processing the received signal. For example, the receiver AFE 106 performs operations, such as attenuation, amplification, filtering and analog to digital conversion, on the reflected signals and provides the processed information to a receive beam former configured to forming a consolidated receive beam. The 'receiver AFE' may be referred to as a 'receiver front-end', and accordingly the terms 'receiver front-end' and 'receiver AFE' will be used interchangeably throughout the description. A block diagram of the receiver AFE of the ultrasound system 100 is illustrated in FIG. 2.

In an embodiment, the ultrasound system 100 includes a termination that is configured to avoid internal reflections caused in the receiver AFE 106. Such reflections are undesirable since they cause interference in the ultrasound system 100. In an embodiment, the termination is provided at an input of the receiver AFE 106 to thereby avoid the reflections in the cable 110. In an embodiment, the termination is designed to match system input impedance and hence minimize signal reflections. In an embodiment, the termination is an active termination. The termination, however, degrades a noise floor of the receiver AFE 106. It is noted that the term 'noise floor' may refer to a smallest level of noise for which a given circuit or a system of the receiver AFE 106 is useful, and, accordingly, a low value of the "noise floor" is desirable.

Figure 2:
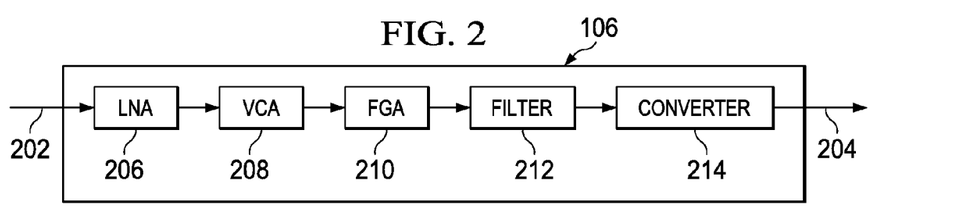
FIG. 2 illustrates a block diagram of a receiver front-end of the ultrasound system of FIG. 1 in accordance with an exemplary embodiment.

FIG. 2 illustrates a block diagram of the receiver AFE 106 of the ultrasound system 100 of FIG. 1 in an exemplary embodiment. The receiver AFE 106 includes a receiver processing chain having blocks representative of various operations, such as attenuation, amplification, filtering and analog to digital conversion, and the like, being performed by the receiver AFE 106 on the reflected signals (or the echoes). Hereinafter, various operations being performed in the receiver AFE 106 may be referred to as a receiver processing chain. The receiver AFE 106 of FIG. 2 is shown to include a single receiver processing chain configured to receive an input signal from a transducer (for example, the transducer 102). However, it will be understood that the receiver AFE 106 may include a plurality of receiver processing chains, such that each receiver processing chain receives input from a transducer of the array of transducers. Additionally, since the receiver AFE 106 includes the receiver processing chain for processing the reflected signals (or the echoes), the terms "receiver processing chain" and the "receiver AFE" will be used interchangeably throughout the description.

As illustrated in FIG. 2, the reflected signals or the one or more echoes 202 are input and processed at the receiver AFE 106 to generate a received signal 204 at the output of the receiver AFE 106. The receiver AFE 106 includes a low noise amplifier (LNA) 206, a voltage controlled attenuator (VCA) 208, a fixed gain amplifier (FGA) 210, a filter 212 and an analog-to-digital converter (ADC) 214. The LNA 206 provides amplification to the received signal echo 202 with minimum noise addition. The input to the LNA 206 varies from as large as 2 V peak-to-peak ("p-p") to as low as noise floor of the receiver processing chain. In order to get a low input signal above the noise floor associated with the ADC 214, a gain is provided in the LNA 206 and the FGA 210. The LNA 206 forwards the amplified signal to the VCA 208.

In an embodiment, since the echoes are reflected from different depths of the body parts, they undergo different attenuation. In order to compensate for loss in signal strength associated with the echo signal, the received echo signals are subjected to a variable gain (varying with time) by time gain compensation, thereby enabling all the received echoes to be amplified to a substantially similar amplitude. In an embodiment, the VCA 208 is coupled with or connected to the FGA 210, and the VCA 208 and the FGA 210 collectively provide time gain compensation to enable all received echoes (corresponding to a single transmitted pulse) to be amplified to a same, or substantially similar, preselected amplitude level. In an embodiment, a same or similar preselected amplitude level may be equal to the full-scale range of the ADC 214 in the receiver processing chain (for example, the ADC 210 with respect to the receiver processing chain illustrated in FIG. 2). In an embodiment, at a high signal level or strength, the VCA 208 is used to get the ADC 214 input within its dynamic range. The term 'dynamic range' may refer to a range to be considered from a wide range of available echo signals. For example, at maximum input, the VCA 208 provides a relatively high or maximum attenuation so as to maintain the ADC 214 input within a preselected amplitude range. As the signal level reduces, the attenuation provided by the VCA 208 is reduced so as to prevent a decrease in amplitude of the input to the ADC 214 (such as by maintaining the input to the ADC 214 as large as possible).

The output of the FGA 206 is provided to the filter 212. The filter 212 removes those frequency components from the output of the FGA 206 that are above a preselected frequency (e.g., at least greater than half of the sampling frequency (or Nyquist frequency) of the ADC 214). The ADC 214 samples the gained and anti-alias filtered signals received from the output of the filter 212 at corresponding sampling time instances to generate/output corresponding digital codes (for example, the output signal 204). The ADC 214 forwards the digital codes to a receive beam former which may then generate a consolidated receiver signal or a number of beams. The receiver beams are processed to generate the image.

In an embodiment, a good noise performance in the receiver processing chain of the ultrasound system 100 relies on the LNA 206 at the beginning of the receiver processing chain (or the receiver AFE 106), which minimizes or decreases the noise contribution in the following VCA 208. Referring to FIG. 1, in an embodiment, when the T/R switch 108 is continuously in the receive mode, a termination is included at the input of the receiver AFE 106 (or at the input of the LNA 206). Accordingly, in order to support an input signal (which may be representative of received echoes) as large as 2 V p-p, the supply rail associated with the LNA 206 is to be at least 3 V. Additionally, when the input swings close to 2 V p-p, the input non-linearity (HD2 and HD3) also degrades. Accordingly, pursuant to an exemplary scenario, the termination disposed at the input of the LNA 206 degrades the noise performance of the receiver processing chain, which is to be avoided in accordance with an embodiment.

In an embodiment, the noise induces quality deterioration in the output (for example, images) of the receiver AFE and provides a negative impact on applications utilizing ultrasound systems, for example, clinical diagnosis. In an embodiment, the degraded noise floor of the receiver AFE 106 may cause saturation in the receiver AFE, for example, the receiver AFE 106. For example, 2 V p-p signal may saturate the receiver AFE 106 and lead to an overload condition. In an embodiment, the overload condition in the receiver AFE 106 is avoided, and the receiver AFE 106 is recovered from the overload condition as soon as possible. However, due to a low frequency time constant in the receiver AFE 106, the recovery from the overload condition in the receiver AFE 106 is delayed. It is noted that the term 'recovery from the overload condition' may hereinafter be referred to as 'overload recovery'. Accordingly, an embodiment provides that the low frequency components of the input signal (or the echoes) are avoided or removed by the receiver AFE 106. The input signal and its components are explained in greater detail with reference to FIG. 3.

Figure 3A:
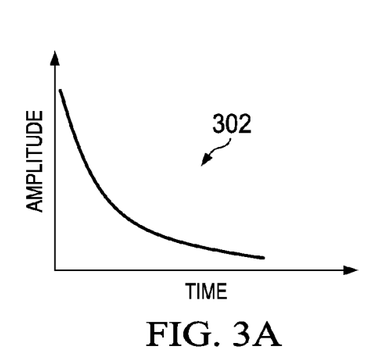
FIGS. 3a and 3b are timing diagrams illustrating components of an echo signal input to the receiver AFE of the ultrasound system of FIGS. 1 and 2, and FIGS. 3c and 3d are timing diagrams illustrating resulting input and output waveforms of the receiver AFE in accordance with an exemplary embodiment.
Figure 3B:
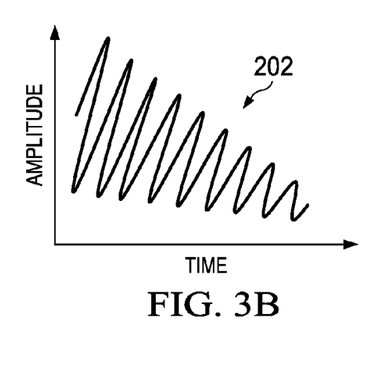
Figure 3C:
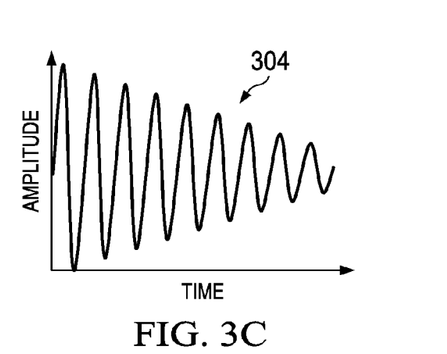
Figure 3D:
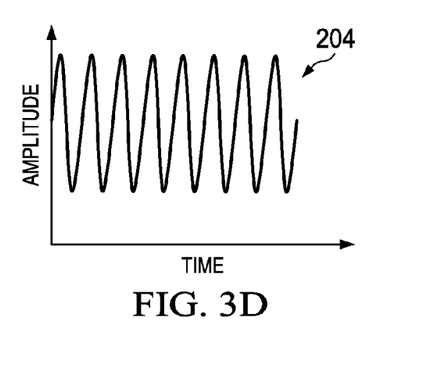

FIGS. 3a, and 3b are a timing diagrams illustrating components of an echo signal (for example, the echo signal 202), which are input to a receiver AFE, for example, the receiver AFE 106 of the ultrasound system 100 of FIGS. 1 and 2, in accordance with an exemplary embodiment. Also, FIGS. 3c and 3d are timing diagrams illustrating resulting input and output waveforms of the AFE 106.

The echo signal 202 is provided as an input to the LNA, for example the LNA 206 of the receiver AFE (for example, the receiver AFE 106). In an embodiment, the echo signal 202 includes a plurality of components associated with various frequencies. For example, as illustrated in FIG. 3, the echo signal 202 includes a low frequency component 302 and a high frequency component 304. The low frequency component 302 is introduced because of the operation of the T/R switch (for example, the T/R switch 108), and the high frequency component 304 of the echo signal 202 is generated from the transducer (for example, the transducer 102). It is noted that each of the low frequency component 302 and the high frequency component 304 may be a single component or a combination of a plurality of low frequency components and a plurality of high frequency components, respectively.

In an embodiment, the signal strength of echo signals 202 vary as the echo signals 202 are reflected from different depths of the body parts, thereby undergoing different levels of attenuation. In order to compensate for loss in signal strength associated with the echo signal, the received echo signals are subjected to a variable gain (varying with time) by time gain compensation, thereby enabling all the received echoes to be amplified to a substantially similar amplitude. As illustrated in FIG. 3, output of the receiver AFE 106 after time gain compensation is shown by the signal waveform marked as 204.

In an embodiment, for the proper functioning of the receiver AFE 106, the receiver AFE 106 should respond to the high frequency components only since the low frequency components are associated with the receiver noise. Additionally, due to a large signal swing associated with the echo signals, the supply rail associated with the LNA 206 needs to be high, which leads to higher power consumption in the receiver AFE 106. Accordingly, the signal swing seen by the LNA 206 and the power consumption in the receiver AFE 106 is preselected to be low.

In an embodiment, the VCA of the receiver AFE may be split into two attenuators (for example, a first attenuator and a second attenuator) such that one of the attenuators (for example, the first attenuator) is implemented prior to the LNA in the receiver AFE. The first attenuator and the second attenuator may selectively provide attenuation to the echo signals based on the strength of the echo signals. For example, when the strength of the echo signals is highest, both of the first attenuator and the second attenuator may provide maximum attenuation. Additionally, when the strength of the echo signal reduces, the attenuation provided by the first attenuator also reduces. In an embodiment, when the signal strength of the echo signals is below a predetermined threshold, the attenuation is provided by the second attenuator, and the attenuation provided by the second attenuator is nullified. In an embodiment, the predetermined threshold of the one or more echo signals may be associated with the strength of the echo signals when the echo signals primarily include lower frequency components. An implementation of a system comprising the first attenuator and the second attenuator is described with reference to FIG. 4.

Figure 4:
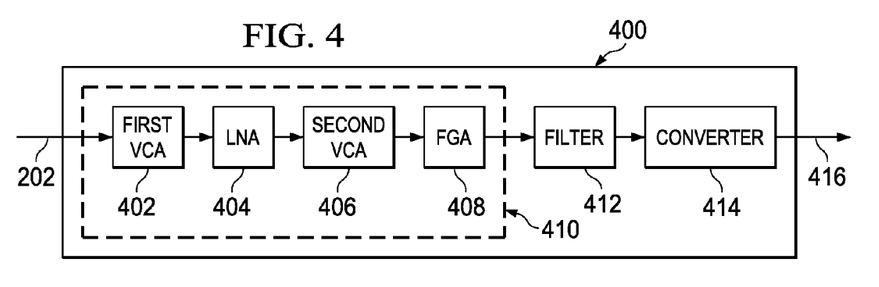
FIG. 4 illustrates a block diagram of a receiver system of an ultrasound system according to an embodiment.

FIG. 4 illustrates a block diagram of a system 400 for receiving one or more echoes in accordance with an embodiment. In an embodiment, the system 400 includes a first attenuator 402, a first amplifier 404, and a second attenuator 406. In an embodiment, the first attenuator 402 and the second attenuator 406 are configured to selectively attenuate one or more echo signals based on a strength of the one or more echo signals. Initially, when the strength of the input signal (having one or more echo signals) is high, both the first attenuator 402 and the second attenuator 406 provide maximum attenuation. As the strength of the input signal reduces, the attenuation provided by the first attenuator 402 is reduced. Once the attenuation provided by the first attenuator 404 is minimized or eliminated as a reduction in signal strength of the one or more echo signals is realized, the attenuation provided by the second attenuator 406 begins to decrease.

In an embodiment, the first attenuator 402 is configured to receive the one or more echo signals, for example, the echo signal 202 and generate a set of first attenuated echo signals corresponding to the one or more echo signals, respectively, based on a number of signal strengths of the one or more echo signals 202. As described in FIG. 3, in an embodiment, the echo signals 202 may include high frequency components (for example, the high frequency component 304) and low frequency components (for example, the low frequency component 302). In one embodiment, the first attenuator 402 is configured to generate a set of first attenuated echo signals based on respective signal strengths of signals of the one or more echo signals. In an embodiment, the first set of echo signals are associated with the high frequency echo signals. In one embodiment, the first attenuator 402 is configured to respond to the high frequency echo signals, rather than only and not the low frequency echo signals.

In an embodiment, the first attenuator 402 is a voltage controlled attenuator (VCA). In an embodiment, the first attenuator 402 is realized using a first resistor network at an input of the first amplifier 404. In particular, the first resistor network comprises a buffer coupled with or connected to a variable resistor-capacitor arrangement. The buffer along with the capacitor is configured to provide a low pass filter configuration to the low frequency echo signals, and, accordingly, for the low frequency input signal, the output of the first attenuator 402 is equal or substantially similar to the input. However, the high frequency echo signals are attenuated by the first attenuator 402. In an embodiment, the attenuation of the high frequency echo signals by the first attenuator 402 is determined based on an impedance ratio of impedance values of an input resistor and the first variable shunt resistor.

In an embodiment, when the input signal to the first attenuator is high, value of the first variable resistor 506 is low, thereby providing better termination, and when the amplitude of the input signal lowers down, the value of the first variable resistor is high, thereby providing better noise level. An exemplary implementation of the first attenuator 402 is explained in detail with reference to FIG. 5.

The first attenuator 402 is coupled with or connected to the first amplifier 404. In an embodiment, the first amplifier is a LNA, for example, the LNA 206 (Refer to FIG. 2). The first amplifier 404 is configured to receive and amplify the set of first attenuated echo signals received from the first attenuator 402 to thereby generate a set of first amplified echo signals corresponding to the one or more first attenuated echo signals, respectively. Additionally, the first amplifier 404 is configured to forward the set of first amplified echo signals to the second attenuator 406. The second attenuator 406 is configured to receive the set of first amplified echo signals from the first amplifier 404, and, in response, a set of second attenuated echo signals corresponding to the set of first amplified echo signals, respectively, based on a number of signal strengths of the set of first amplified echo signals, respectively. In an embodiment, the first amplifier 404 receives the low frequency signal which is rejected by the high pass filter characteristics of the first amplifier 404.

In an embodiment, the second attenuator 406 is a VCA. In an embodiment, the second attenuator 406 is realized by using a voltage divider network having a second series resistance and a second variable shunt resistance. In an embodiment, the attenuation of the echo signals by the second attenuator 406 is determined based on the second series resistance and the second variable shunt resistance. An exemplary implementation of the second attenuator 406 is explained in detail with reference to FIG. 6.

In the present embodiment, the first amplifier 404 is implemented after the first attenuator 402 and prior to the second attenuator 406. When the signal strength of the echo signals 202 is highest, the attenuation provided by the first attenuator 402 is at a maximum level, thereby facilitating a reduction in the signal swing experienced by the first amplifier 404. Accordingly, the supply rail of the first amplifier 404 can be reduced, thereby facilitating a power reduction in the receiver AFE 400. In an embodiment, the input non-linearity is reduced.

In an embodiment, the receiver AFE 400 further includes a second amplifier 408, a filter 410 and a converter 412. In an embodiment, the second amplifier 408 is a fixed gain amplifier (FGA). In an embodiment, the second amplifier 408 is coupled with or connected to the second attenuator 406. In an embodiment, when the echo signals 202 travels in a medium, for example, in the body, the echo signals 202 are attenuated logarithmically, and are to be compensated for the signal attenuation offered to the echo signals coming from different parts of the body. In an embodiment, the second amplifier 408 and the second attenuator 406 are configured to collectively equalize a voltage level of the set of the first amplified echo signals received from the output of the first amplifier 404 based on time gain compensation. In an embodiment, the second amplifier 408 and the second attenuator 406 along with the first amplifier 404 and the first attenuator 402 configures a variable gain amplifier (VGA) 410 for compensating for the attenuation (as a function of time) of the received echo signals based on time gain compensation.

The filter 412 is coupled with or connected to the second amplifier 408 and is configured to filter, from the set of second attenuated echo signals, a number of echo signals comprising a signal frequency within a predetermined frequency range to thereby generate one or more filtered echo signals. In an embodiment, the predetermined frequency range may refer to a range of frequencies, such that the filter 412 is configured to filter or block a number of echo signals having frequencies outside of this range. In an embodiment, the filter 412 is an anti-aliasing filter (AAF).

The converter 414 is coupled with or connected to the filter 412 and is configured to convert the one or more filtered echo signals output from the filter 412 into a received signal, for example a received signal 416. In an embodiment, the converter 214 is an analog to digital converter (ADC).

The system 400 is included in a system in which the echoes are received and processed. Pursuant to one embodiment, the system 400 is embodied in an ultrasonic system. The receiver system 400 is therefore included within a receiver front-end (or an AFE). Accordingly, in one embodiment, the block diagram of the system 400 is also illustrative of a receiver AFE, and the numeral 400 may be interchangeably used to refer to a receiver AFE, a receiver front-end and a system. Additionally, since the system 400 is included in an echo receiving and processing system, the LNA 206, the FGA 210, the filter 212, and the ADC 214 of the receiver AFE 106 (Refer to FIG. 1) may be used in place of the first amplifier 404, the second amplifier 408, the filter 412, and the converter 414, of the receiver system 400; while the VCA 208 is replaced by the first attenuator 402 and the second attenuator 406. It is noted that, since the first amplifier 404, the second amplifier 408, the filter 412, and the converter 414 of FIG. 4 are similar to the respective components of FIG. 2, the description thereof is omitted herein for the sake of brevity.

Figure 5:
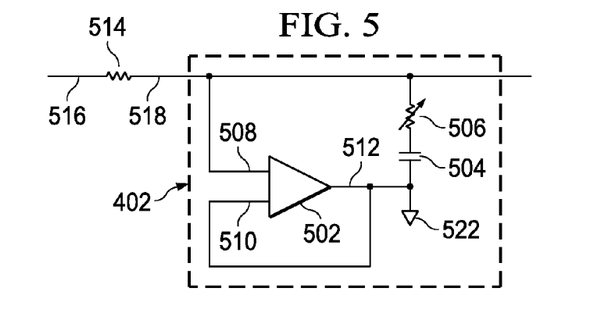
FIG. 5 is circuit diagram for a first attenuator of the receiver AFE of FIG. 4 according to an embodiment.

FIG. 5 illustrates a circuit diagram of the first attenuator 402 of the receiver AFE 400 of FIG. 4, in accordance with an embodiment. In an embodiment, the first attenuator 402 is implemented in a manner that does not respond to the low frequency components. To prevent the conversion of lower frequency components of the echo signals (for example, low frequency components 302) at the input of the first attenuator 402 into corresponding higher frequency signals by multiplication with the attenuation of the first attenuator 402, a buffer and a capacitor are included in the first attenuator 402.

Without limiting the scope of present technology, in an embodiment, the first attenuator 402 includes a buffer 502, a capacitor 504, and a variable shunt resistor 506. The buffer 502 includes a first input terminal 508, a second input terminal 510 and an output terminal 512. The first input terminal 508 of the buffer 502 is coupled with or connected to an input resistor 514. In an embodiment, the input resistor 514 is representative of equivalent resistor of a transducer. In an embodiment, the input resistor 514 includes a first terminal 516 and a second terminal 518 such that the first terminal 516 is configured to receive the one or more eco signals, such as echo signals 202. The second terminal 518 of the input resistor 514 is coupled with or connected to the first input terminal 508 of the buffer 502. The second input terminal 510 of the buffer 502 is coupled with or connected to the output terminal 512 of the buffer 502. Also, the output terminal 512 of the buffer 502 is coupled with the capacitor 504. For example, as illustrated in FIG. 4, the output terminal 512 of the buffer 502 is coupled with or connected to a first terminal of the capacitor 504 while an output terminal of the capacitor 504 is coupled with or connected to a voltage reference point 520 (for example, a ground plane). In an embodiment, the buffer 502 and the capacitor configures a low pass filter.

In an embodiment, the attenuation provided by the first attenuator 402 is determined based on an impedance ratio of impedance values of the input resistor 514 and the first variable shunt resistor 506. For example, when the signal strength is high or when the echo signals comprise high frequency signals, the value of the first variable resistor 506 is set to a minimum level, thereby allowing maximum attenuation of the received echo signals.

In an embodiment, when the echo signals comprising the high frequency components and the low frequency components are received at the input of the receiver AFE (or the first attenuator 402), the buffer 502 and the capacitor 504 filters the input echo signals and feed or route low frequency signals to the other end of the first variable shunt resistor 506. The first variable shunt resistor 506 functions as an infinite resistor and does not introduce any attenuation for the low frequency components of the echo signals. The attenuation provided by the first attenuator 402 may be represented by the following expression:

$$\text{Attenuation}_{(First\ VCA1)} = R_{shunt}/(R_{shunt} + R_{source}),$$

where, $R_{source}$ represents the impedance value of the input resistor 514 (indicative of transducer resistance), and $R_{shunt}$ represents the impedance value of the first variable shunt resistor 506.

In one embodiment, $R_{shunt}$ also functions as a termination resistance such that a separate termination in the receiver AFE may be avoided.

Figure 6:
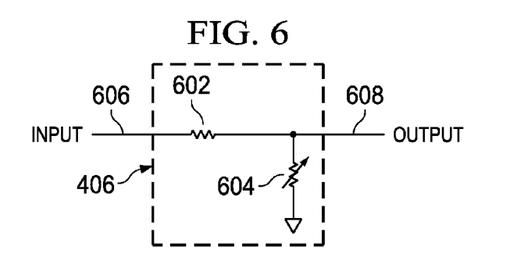
FIG. 6 is circuit diagram for a second attenuator of the receiver AFE of FIG. 4 according to an embodiment.

FIG. 6 illustrates a circuit diagram of the second attenuator 406 of the receiver AFE 400 of FIG. 4, in accordance with an embodiment. Without limiting the scope of present technology, in an embodiment, the second attenuator 406 comprises a second series resistor 602 and a second variable shunt resistor 604 configurable to provide an impedance ratio. In an embodiment, the attenuation provided by the second attenuator 406 is determined by the impedance ratio. For example, the attenuation provided by the second attenuator 406 may be represented by the following expression:

$$\text{Attenuation}_{(second\ VCA)} = R_1/(R_1 + R_{in}),$$

where, $R_1$ represents the impedance value of the second variable shunt resistor 604, and $R_{in}$ represents the impedance value of the second input resistor 602.

In an embodiment, the relation between the input and the output of the second VCA 406 is represented by the following expression:

$$\text{OUTPUT 608 of the second attenuator } 406 = R1/(R1+Rin) * \text{INPUT 606 of the second VCA 406.}$$

The FIGS. 5 and 6 illustrate circuit configurations for the first attenuator 402 and the second attenuator 406. It is noted, however, that the present technology is not limited to the exemplary circuit configurations of the first attenuator 402 and the second attenuator 406 shown in FIGS. 5 and 6. Instead, the first attenuator 402 and the second attenuator 406 may assume different configurations and be realized using circuit components other than those presented here. Accordingly, various embodiments of the present technology provide arrangements and circuits that can be used in receiver AFEs in various applications. For instance, the receiver AFE 400 explained with reference to FIG. 4, and other variants of the receiver AFE 400, may be utilized in medical devices, ultrasonic devices, and the like. An exemplary ultrasound device incorporating the receiver AFE 400 disclosed herein will now be explained with reference to FIG. 7.

Figure 7:
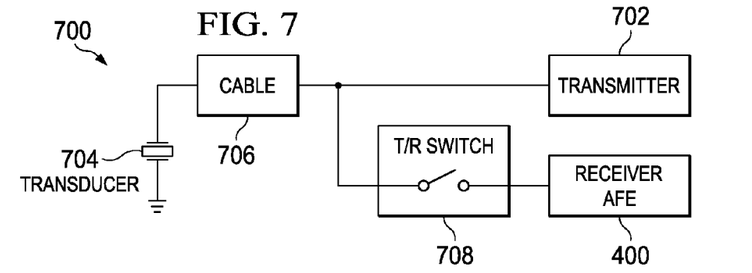
FIG. 7 illustrates a block diagram of an ultrasound system in according to an embodiment.

FIG. 7 is a block diagram for an ultrasonic system 700 incorporating the receiver AFE 400 of FIG. 4 in an embodiment. As depicted in FIG. 7, the ultrasound system 700 includes a transmitter 702, at least one transducer (for example, a transducer 704) and a receiver front-end (for example, the receiver AFE 400). The transmitter 702 is configured to generate and transmit one or more excitation signals. In an embodiment, the one or more excitation signals used to excite the at least one transducer have high voltage amplitudes of the order of 100 Volts. The at least one transducer, for example, the transducer 704, is coupled with or connected to the transmitter 702 through a cable, for example, a cable 706, and is configured to receive the one or more excitation signals and, in response, generate a transmit signal. A T/R switch, such as a T/R switch 708 is configured to control the echo signals being received at the receiver AFE 400. In an embodiment, the transmitter 702, the at least one transducer 704, the cable 706, and the T/R switch 708 are similar in function and operation to the corresponding components, for example, the transmitter 104, the at least one transducer 102, the cable 110, and the T/R switch 108 respectively of the ultrasound system 100 (explained with reference to FIG. 1), and accordingly, description thereof is omitted from herein.

The receiver front-end, for example the receiver front-end 400, is configured to receive one or more echo signals that are generated in response to the transmit signal. The receiver front-end 400 is also configured to process the one or more echo signals by performing attenuation, amplification, filtering and analog to digital conversion, and the like, on the reflected signals. Various exemplary components of the receiver front-end 400 and functionalities thereof have already been explained with reference to FIG. 4.

As described above, the systems, devices (e.g., apparatuses) and methods of the present disclosure include solutions for performing receiver AFEs in various applications, such as ultrasound systems. It is noted, therefore, that the present disclosure discloses several features that enable the operation of receiver AFE in a power efficient manner. Additionally, the disclosed techniques facilitate reduction of the noise at lower signal levels.

Various disclosed systems include an architecture having a first attenuator and a second attenuator, wherein the first attenuator is disposed prior to the amplifier and the second attenuator is disposed after the amplifier. In an embodiment, when the signal swing is highest, the attenuation in the first attenuator is also at a maximum level. The disposition of the second attenuator after the amplifier reduces signal swing met by the amplifier. This helps in power reduction as the supply rail associated with the amplifier can be lowered. Additionally, the input non-linearity is reduced.

In an embodiment, a termination is applied prior to the receiver AFE in order to reduce reflections arising due to the operation of the T/R switch. However, pursuant to one embodiment, when the T/R switch closes, the signal swing is at a maximum level, and, accordingly, the attenuation provided by the first attenuator is also at a maximum level. As the strength of the input signal (or echoes) reduces, the signal swing also reduces. Accordingly, the attenuation provided by the first attenuator also reduces. Particularly, the first attenuator and the second attenuator selectively control the attenuation of the echo signals received at the receiver AFE. Additionally, the first variable resistance of the first attenuator functions as a termination resistance, thereby precluding a separate termination. Also, in an embodiment, when the signal swing reduces, the first variable resistance of the first attenuator opens out or the resistance value of the first variable resistor is increased considerably, thereby reducing noise at a lower signal level.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment is included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system comprising:
    a first attenuator configured to receive one or more echo signals and generate a set of first attenuated echo signals corresponding to the one or more echo signals, respectively, based on a number of signal strengths of the one or more echo signals, respectively;
    a first amplifier configured to receive and amplify the set of first attenuated echo signals to thereby generate a set of first amplified echo signals corresponding to the one or more first attenuated echo signals, respectively; and
    a second attenuator configured to receive the set of first amplified echo signals and generate a set of second attenuated echo signals corresponding to the set of first amplified echo signals, respectively, based on a number of signal strengths of the set of first amplified echo signals, respectively,
    wherein the first attenuator comprises:
    a buffer comprising a first input terminal, a second input terminal and an output terminal, the first input terminal coupled with a an input resistor and the second input terminal coupled with the output terminal of the buffer, the input resistor configured to receive the one or more echo signals;
    a capacitor comprising a first terminal and a second terminal, the first terminal coupled with the output terminal of the buffer, and the second terminal being coupled with a voltage reference point; and
    a variable shunt resistor coupled with the capacitor,
    whereby the buffer and the capacitor configures a low pass filter, and a value of the first variable shunt resistor varies based on the number of signal strengths of the one or more echo signals to thereby vary the attenuation provided by the first attenuator.

2. The system of claim 1, wherein the attenuation provided by the first attenuator is determined based on an impedance ratio of impedance values of the input resistor and the first variable shunt resistor.

3. The system of claim 1, wherein the second attenuator comprises:
    a second series resistor configured to receive output of the first amplifier; and
    a second variable shunt resistor, configured to provide output of the second attenuator based on an impedance ratio of the second series resistor and the second variable shunt resistor.

4. The system of claim 1, wherein when a signal strength of the number of signal strengths one or more echo signals is high, the first attenuator and the second attenuator are configured to provide maximum attenuation.

5. The system of claim 1, wherein when a signal strength of the number of signal strengths of the one or more echo signals is below a predetermined threshold, the attenuation is provided by the second attenuator, and the attenuation provided by the first attenuator is nullified.

6. The system of claim 1, further comprising:
    a second amplifier coupled with the second attenuator, the second amplifier and the second attenuator collectively configured to equalize a voltage level of the set of first amplified echo signals received from the output of the first amplifier based on time gain compensation;
    a filter coupled with the second amplifier and configured to filter, from the set of second attenuated echo signals, a number of echo signals comprising a signal frequency within a predetermined frequency range to thereby generate one or more filtered echo signals; and a converter coupled with the filter and configured to convert the one or more filtered echo signals into a received signal.

7. The system of claim 1, wherein the first amplifier is a low noise amplifier (LNA), the second amplifier is a fixed gain amplifier (FGA), and the filter is an anti-aliasing filter (AAF).

8. The system of claim 1, wherein the first attenuator and the second attenuator are voltage controlled attenuators (VCA).

9. The system of claim 1, wherein the system is a receiver front-end system for an ultrasonic system.

10. A receiver front-end system for an ultrasonic system comprising:
   a variable gain amplifier comprising:
      a first attenuator configured to receive one or more echo signals and generate a set of first attenuated echo signals corresponding to the one or more echo signals, respectively, based on a number of signal strengths of the one or more echo signals, respectively;
      a first amplifier configured to receive and amplify the set of first attenuated echo signals to thereby generate a set of first amplified echo signals corresponding to the one or more first attenuated echo signals, respectively;
      a second attenuator configured to receive the set of first amplified echo signals and generate a set of second attenuated echo signals corresponding to the set of first amplified echo signals, respectively, based on a number of signal strengths of the set of first amplified echo signals, respectively; and
      a second amplifier coupled with the second attenuator, the second amplifier and the second attenuator collectively configured to equalize a voltage level of the set of first amplified echo signals received from the output of the first amplifier based on time gain compensation;
   a filter coupled with the second amplifier and configured to filter, from the set of second attenuated echo signals, a number of echo signals comprising a signal frequency within a predetermined frequency range to thereby generate one or more filtered echo signals; and
   a converter coupled with the filter and configured to convert the one or more filtered echo signals into a received signal;
   wherein the first attenuator comprises:
      a buffer comprising a first input terminal, a second input terminal and an output terminal, the first input terminal coupled with a an input resistor and the second input terminal coupled with the output terminal of the buffer, the input resistor configured to receive the one or more echo signals;
      a capacitor comprising a first terminal and a second terminal, the first terminal coupled with the output terminal of the buffer, and the second terminal being coupled with a voltage reference point; and
      a variable shunt resistor coupled with the capacitor, whereby the buffer and the capacitor configures a low pass filter, and a value of the first variable shunt resistor varies based on the number of signal strengths of the one or more echo signals to thereby vary the attenuation provided by the first attenuator.

11. The receiver front-end system of claim 10, wherein the second attenuator comprises:
   a second series resistor configured to receive output of the first amplifier; and
   a second variable shunt resistor, configured to provide output of the second attenuator based on an impedance ratio of the second series resistor and the second variable shunt resistor.

12. The receiver front-end system of claim 10, wherein when a signal strength of the number of signal strengths of the one or more echo signals is high, the first attenuator and the second attenuator are configured to provide maximum attenuation.

13. The receiver front-end system of claim 10, wherein when a signal strength of the number of signal strengths of the one or more echo signals is below a predetermined threshold, the attenuation is provided by the second attenuator, and the attenuation provided by the first attenuator is nullified.

14. The receiver front-end system of claim 10, wherein the receiver front-end system is associated with an ultrasound system.

15. An ultrasound system comprising:
   a transmitter configured to generate and transmit one or more excitation signals;
   at least one transducer coupled with the transmitter and configured to generate a transmit signal based on the one or more excitation signals, the transducer comprising an input resistor; and
   a receiver front-end coupled with the at least one transducer, and configured to receive one or more echoes in response to the transmit signal, the receiver front-end comprising:
      a first attenuator configured to receive one or more echo signals and generate a set of first attenuated echo signals corresponding to the one or more echo signals, respectively, based on a number of signal strengths of the one or more echo signals, respectively;
      a first amplifier configured to receive and amplify the set of first attenuated echo signals to thereby generate a set of first amplified echo signals corresponding to the one or more first attenuated echo signals, respectively;
      a second attenuator configured to receive the set of first amplified echo signals and generate a set of second attenuated echo signals corresponding to the set of first amplified echo signals, respectively, based on a number of signal strengths of the set of first amplified echo signals, respectively; and
      a second amplifier coupled with the second attenuator, the second amplifier and the second attenuator collectively configured to equalize a voltage level of the set of first amplified echo signals received from the output of the first amplifier based on time gain compensation;
      a filter coupled with the second amplifier and configured to filter, from the set of second attenuated echo signals, a number of echo signals comprising a signal frequency within a predetermined frequency range to thereby generate one or more filtered echo signals; and
      a converter coupled with the filter and configured to convert the one or more filtered echo signals into a received signal;
   wherein the first attenuator comprises:
   a buffer comprising a first input terminal, a second input terminal and an output terminal, the first input terminal coupled with a an input resistor and the second input terminal coupled with the output terminal of the buffer, the input resistor configured to receive the one or more echo signals;

a capacitor comprising a first terminal and a second terminal, the first terminal coupled with the output terminal of the buffer, and the second terminal being coupled with a voltage reference point; and a variable shunt resistor coupled with the capacitor, whereby the buffer and the capacitor configures a low pass filter, and a value of the first variable shunt resistor varies based on the signal strength of the one or more echo signals to thereby vary the attenuation provided by the first attenuator.

16. The ultrasound system of claim 15, wherein when the signal strength of the number of signal strengths of the one or more echo signals is high, the first attenuator and the second attenuator are configured to provide maximum attenuation.

17. The ultrasound system of claim 15, wherein when a signal strength of the number of signal strengths of the one or more echo signals is below a predetermined threshold, the attenuation is provided by the second attenuator, and the attenuation provided by the first attenuator is nullified.

* * * * *